(12) United States Patent
Bartsch et al.

(10) Patent No.: US 10,254,390 B2
(45) Date of Patent: Apr. 9, 2019

(54) METHOD FOR OPERATING AN ULTRASONIC SENSOR APPARATUS OF A MOTOR VEHICLE, ULTRASONIC SENSOR APPARATUS, AND MOTOR VEHICLE

(71) Applicant: VALEO Schalter und Sensoren GmbH, Bietigheim-Bissingen (DE)

(72) Inventors: Armin Bartsch, München (DE); Thorben Günzel, Braunschweig (DE); Paul-David Rostocki, Bietigheim-Bissingen (DE); Michael Hallek, Bietigheim-Bissingen (DE); Ulrich Bressler, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 193 days.

(21) Appl. No.: 15/306,525

(22) PCT Filed: Apr. 29, 2015

(86) PCT No.: PCT/EP2015/059398
§ 371 (c)(1),
(2) Date: Oct. 25, 2016

(87) PCT Pub. No.: WO2015/165996
PCT Pub. Date: Nov. 5, 2015

(65) Prior Publication Data
US 2017/0052249 A1    Feb. 23, 2017

(30) Foreign Application Priority Data
Apr. 29, 2014   (DE) .................. 10 2014 106 008

(51) Int. Cl.
*G01S 7/52* (2006.01)
*G01S 15/93* (2006.01)
(Continued)

(52) U.S. Cl.
CPC ......... *G01S 7/52004* (2013.01); *B60W 50/04* (2013.01); *G01S 15/876* (2013.01);
(Continued)

(58) Field of Classification Search
None
See application file for complete search history.

(56) References Cited

U.S. PATENT DOCUMENTS

| 2014/0039750 A1 | 2/2014 | Yopp et al. |
| 2016/0033628 A1* | 2/2016 | Lee ..................... G01S 7/527 |
| | | 367/98 |

FOREIGN PATENT DOCUMENTS

| CN | 101846744 A | 9/2010 |
| CN | 202900392 U | 4/2013 |

(Continued)

OTHER PUBLICATIONS

International Search Report issued in PCT/EP2015/059398, dated Jul. 15, 2015 (2 pages).
(Continued)

*Primary Examiner* — Hovhannes Baghdasaryan
(74) *Attorney, Agent, or Firm* — Osha Liang LLP

(57) ABSTRACT

The invention relates to a method for operating an ultrasonic sensor apparatus (2) of a motor vehicle (1), in which method ultrasound waves are emitted into a surrounding region (9) of the motor vehicle (1) by at least one ultrasonic sensor (3) of the ultrasonic sensor apparatus (2) in order to carry out a distance measurement, wherein an exhaust gas cloud (22) which is emitted into the surrounding region (9) by an exhaust system (11) of the motor vehicle (1) and at which the ultrasound waves are reflected is detected by the ultrasonic sensor apparatus (2) on the basis of sensor data from at least one sensor (18, 19, 20, 21) of the motor vehicle (1), which at least one sensor is different from the ultrasonic sensor (3), and the ultrasonic sensor apparatus (2) is operated depending on the detection of the exhaust gas cloud (22).

13 Claims, 2 Drawing Sheets

Figure 1:
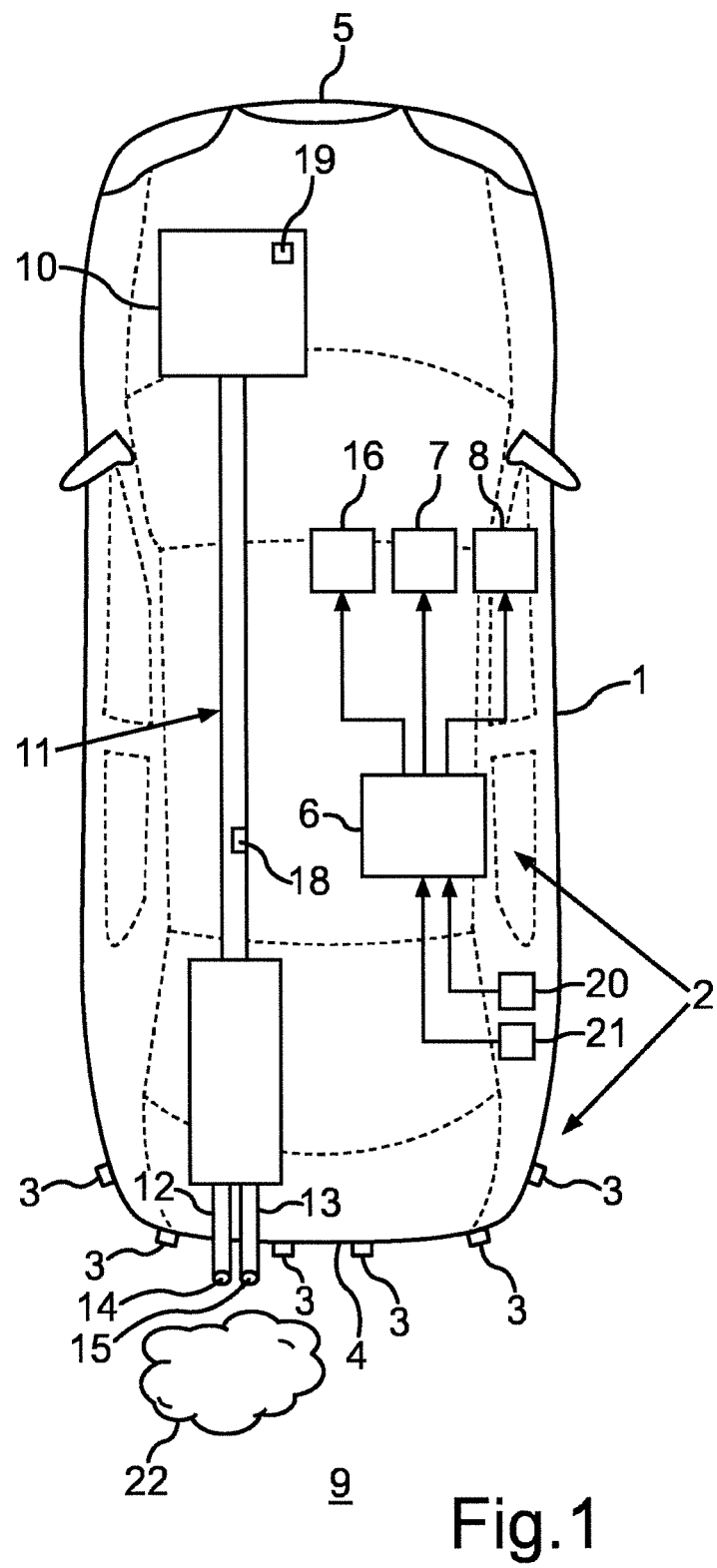

(51) Int. Cl.
G01S 15/87 (2006.01)
B60W 50/04 (2006.01)

(52) U.S. Cl.
CPC ... G01S 15/931 (2013.01); *G01S 2007/52009* (2013.01); *G01S 2015/938* (2013.01)

(56) References Cited

FOREIGN PATENT DOCUMENTS

| | | |
|---|---|---|
| DE | 10247971 A1 | 5/2004 |
| DE | 10 2004 020423 A1 | 11/2005 |
| DE | 102009040992 A1 | 3/2011 |
| DE | 102010021960 A1 | 12/2011 |
| JP | 2001-066363 A | 3/2001 |

OTHER PUBLICATIONS

Written Opinion of the International Searching Authority issued in PCT/EP2015/059398, dated Jul. 15, 2015 (9 pages).
German Search Report issued in DE 10 2014 106 008.3 dated Aug. 29, 2014 (10 pages).
The First Office Action issued in corresponding Chinese Patent Application No. 201580025913.1, dated Jul. 3, 2018. (15 pages).

\* cited by examiner

METHOD FOR OPERATING AN ULTRASONIC SENSOR APPARATUS OF A MOTOR VEHICLE, ULTRASONIC SENSOR APPARATUS, AND MOTOR VEHICLE

The invention relates to a method for operating an ultrasonic sensor apparatus of a motor vehicle, in which method ultrasound waves are emitted into a surrounding region of the motor vehicle by at least one ultrasonic sensor in order to carry out a distance measurement. The invention also relates to an ultrasonic sensor apparatus which is designed to carry out a method of this kind, and also to a motor vehicle comprising an ultrasonic sensor apparatus of this kind.

Ultrasonic sensors for motor vehicles are already known in a variety of configurations from the prior art. They are usually used for assisting the driver when manoeuvring the motor vehicle, in particular when carrying out parking operations. In this case, the ultrasonic sensors are used to measure distances to obstacles which are located in the area surrounding the motor vehicle. The ultrasonic sensors here belong to a driver assistance device, referred to as a parking aid. However, nowadays ultrasonic sensors are also being used more and more frequently outside this actual parking aid functionality, such as, for example, for driving assistance with active braking interventions, that is to say in automatic braking assistance systems, in blind-spot monitoring systems, in autonomous cruise control systems, in collision identification systems and the like.

Ultrasonic sensors operate according to the echo propagation time principle: in ultrasound technology, the distance measurement is performed by means of an echo propagation time method or echo sounding method. The ultrasonic sensor emits a transmission signal—ultrasound—and receives a reception signal, which is likewise a sound signal and corresponds to a signal component of the transmission signal which was emitted and reflected at an obstacle. In other words, ultrasound waves are emitted, reflected by an object and received again by the same ultrasonic sensor and/or an adjacent ultrasonic sensor of the same motor vehicle, and are evaluated. Depending on the measured propagation time of the ultrasound wave, the distance and if appropriate also the relative position and/or a relative speed relative to the motor vehicle are then determined.

Identification of a blocked state of an ultrasonic sensor of a motor vehicle is currently of particular interest. Methods of this kind which serve to identify a blocked state of an ultrasonic sensor are already known from the prior art. In the prior art, a situation in which the ultrasonic sensor is covered by an additional mass, for example by dirt and/or snow and/or ice, is identified. Since ultrasonic sensors are nowadays also used more and more outside the actual parking aid functionality, it is necessary to ensure during operation of the motor vehicle that the ultrasonic sensors provided on the motor vehicle reliably identify the obstacles which are located in the area surrounding the motor vehicle and can also reliably detect the distances up to a predetermined range. If the ultrasonic sensors are covered by an additional mass, this should be reliably detected. The known methods for identifying ice or dirt are based, in principle, on evaluating side effects which are caused by the additional mass on the ultrasonic sensor. For example, an additional mass influences the so-called decay time of the diaphragm of the ultrasonic sensor or generates a virtual echo or a fraudulent echo, which can be detected by accordingly evaluating the electrical reception signal of the ultrasonic sensor.

In the subject matter according to DE 102 47 971 A1, the natural frequency or resonant frequency of the ultrasonic sensor is measured and compared with stored reference values. This method is based on the fact that the resonant frequency of the ultrasonic sensor is a direct indicator of soiling or a layer of ice or snow since this additional layer influences the mass of the harmonic oscillation. This is because the oscillating mass and consequently also the resonant frequency of the sensor also change with the additional mass of the soiling or the layer of ice or snow.

In order to be able to detect a state in which an ultrasonic sensor is covered by dirt and/or ice and/or snow, DE 10 2009 040 992 A1 proposes detecting the decay frequency of the ultrasonic sensor following excitation of the diaphragm and comparing it with the excitation frequency. The result of this comparison is used to determine whether or not the ultrasonic sensor is blocked.

Furthermore, DE 10 2010 021 960 A1 describes a method in which, in order to identify the blocked state of an ultrasonic sensor, the decay time of the diaphragm is evaluated over a plurality of measurement cycles of the ultrasonic sensor. A further plausibility check may here comprise the blocked state being identified only on the condition that a temperature of the area surrounding the motor vehicle is below a prespecified limit value. This limit value may be 0° C., for example. It is therefore possible to reduce the error rate when identifying the blocked state.

It has now been found that, in some situations, the ultrasonic sensor may well be blocked but this "blindness" of the ultrasonic sensor is not caused by an additional mass on the ultrasonic sensor itself.

Specifically, situations have been detected in which a "blindness" of the ultrasonic sensor has also occurred without a significant change in the decay time of the diaphragm and also without a change in the resonant frequency.

The object of the invention is take measures in a method of the generic type mentioned at the outset which ensure reliable operation of the at least one ultrasonic sensor.

According to the invention, this object is achieved by a method, by an ultrasonic sensor apparatus and also by a motor vehicle having the features according to the respective independent patent claims. The dependent patent claims, the description and the figures relate to advantageous embodiments of the invention.

A method according to the invention serves to operate an ultrasonic sensor apparatus of a motor vehicle, in particular of a passenger car. Ultrasound waves are emitted into a surrounding region of the motor vehicle by at least one ultrasonic sensor of the ultrasonic sensor apparatus in order to carry out a distance measurement. According to the invention, it is provided that an exhaust gas cloud which is emitted into the surrounding region by an exhaust system of the motor vehicle and at which the ultrasound waves can be reflected is detected by the ultrasonic sensor apparatus on the basis of sensor data from at least one sensor of the motor vehicle, which at least one sensor is different from the ultrasonic sensor, and the ultrasonic sensor apparatus is operated depending on the detection of the exhaust gas cloud.

The invention is based on several insights: the invention is initially based on the insight that situations in which a blocked state or a "blindness" of the ultrasonic sensor cannot be detected on the basis of oscillation parameters of the ultrasonic sensor can sometimes occur in the prior art. Specifically, a "blindness" of the ultrasonic sensor can also occur without the decay time or else the resonant frequency of the sensor changing significantly. This state cannot be detected in the prior art and therefore cannot be indicated either. A further insight is that a situation of this kind can be caused by an exhaust gas cloud, which is output by an exhaust system of the motor vehicle, forming in the region of the ultrasonic sensor. The invention is based not least on the insight that the disadvantages of the prior art can be avoided by an exhaust gas cloud of this kind, at the surface or boundary layer of which the ultrasound waves are potentially reflected and can therefore corrupt the distance measurement, being detected by the ultrasonic sensor apparatus and then corresponding measures which ensure fail-safe operation being taken. The ultrasonic sensor apparatus can therefore be operated in a particularly operationally fail-safe and reliable manner.

In the present case, an exhaust gas cloud is understood to be a phase and therefore a particularly high concentration of an exhaust gas which is output by the exhaust system of the motor vehicle and then collects in the region of an exhaust pipe of the exhaust system. It has been found that an exhaust gas cloud of this kind has a boundary layer at which the ultrasound waves can be reflected. This reflection causes a signal echo at the ultrasonic sensor, this being incorrectly interpreted in the prior art as detection of an object.

In respect of the detection of the exhaust gas cloud in the detection region of the ultrasonic sensor, it can be provided in one embodiment that a probability value which indicates the current probability of the presence of an exhaust gas cloud of this kind at which ultrasound waves can be reflected is calculated depending on the said sensor data. The exhaust gas cloud can be detected or the detection can be confirmed when the calculated probability value exceeds a predetermined limit value. In particular, a plurality of measurement variables which can be detected by an extremely wide variety of sensors of the motor vehicle can be used in order to calculate the probability value. The greater the number of measurement variables or parameters taken into account when calculating the probability value, the more precise and realistic determination of the probability of the presence of the exhaust gas cloud can be.

In one embodiment, it can be provided that the exhaust gas cloud is detected, in particular the probability value is determined, depending on at least one measurement variable as sensor data, which measurement variable is measured by means of a sensor which is arranged in the exhaust system itself. The use of a sensor of this kind has the advantage that it can be concluded in a very reliable manner that the exhaust gas has collected in the region of the exhaust pipe on the basis of sensor data from this sensor, and therefore it is possible to determine with a high degree of accuracy whether an exhaust gas cloud which constitutes an obstacle to the ultrasound waves forms in the region of the ultrasonic sensor. In particular, the exhaust gas cloud can be detected depending on at least one of the following measurement variables:

- a temperature of the exhaust gas—this can be detected by means of a temperature sensor in the exhaust system; for the detection of the exhaust gas cloud, it can be required that the temperature of the exhaust gas is greater than a predetermined threshold value—this means, in particular, that the abovementioned probability value can be greater than zero only when the temperature of the exhaust gas is greater than the threshold value; and/or
- a moisture content of the exhaust gas—this can be detected, for example, by means of a moisture sensor in the exhaust system; for the detection of the exhaust gas cloud, it can be required that the moisture content of the exhaust gas is greater than a predetermined associated threshold value—this means, in particular, that the abovementioned probability value can be greater than zero only when the moisture content of the exhaust gas is greater than the associated threshold value; and/or
- a flow rate of the exhaust gas—it can also be provided in this respect that the exhaust gas cloud can be detected or the probability value can be greater than zero only when the flow rate is greater than a prespecified associated threshold value; and/or
- an exhaust gas pressure—a corresponding threshold value with which the current exhaust gas pressure is compared can also be predefined for this measurement variable, wherein the detection of the exhaust gas cloud requires that the exhaust gas pressure is greater than the associated threshold value; and/or
- a mass flow of the exhaust gas—this can also be compared with an associated threshold value; the exhaust gas cloud can be detected only when the mass flow is greater than the associated threshold value; and/or
- a measurement variable which characterizes the ratio of combustion air to a fuel in at least one combustion chamber of an internal combustion engine of the motor vehicle, which measurement variable is measured, in particular, by means of a lambda probe—the detection of the exhaust gas cloud can require that the ratio of combustion air/fuel is lower than an associated threshold value.

In addition or as an alternative, it can be provided that a current engine temperature of an internal combustion engine of the motor vehicle is also taken into account as sensor data for the detection of the exhaust gas cloud. Specifically, the relationship is that the lower the engine temperature, the greater the probability of the presence of an exhaust gas cloud.

It can also be provided that the exhaust gas cloud is detected depending on atmospheric conditions in the area surrounding the motor vehicle, such as, in particular, depending on a wind speed and/or air humidity and/or an air temperature in the area surrounding the motor vehicle. These parameters can be detected by means of corresponding sensors and/or depending on a current geographical position of the motor vehicle which is detected by means of a navigation receiver—in particular a GPS receiver—and transmitted to an Internet server which then informs the motor vehicle of the current atmospheric conditions in the surrounding area for the current position of the motor vehicle. Atmospheric conditions in the surrounding area also have an influence on the generation of an exhaust gas cloud in the region of the motor vehicle. For example, the presence of the exhaust gas cloud is more probable the lower the air temperature and/or the greater the air humidity in the surrounding area.

If the air temperature is detected, a temperature difference between the exhaust gas temperature on the one hand and the air temperature on the other hand and/or a difference between the engine temperature on the one hand and the air temperature on the other hand can be determined and taken into account for the detection of the exhaust gas cloud. The greater this temperature difference, the greater, specifically, the probability of the presence of an exhaust gas cloud in the region of the exhaust pipe of the exhaust system.

The exhaust gas cloud can be detected, and in particular the probability of the presence of the exhaust gas cloud can be calculated, taking into account at least one structural parameter of the motor vehicle too. At least one of the following parameters can be taken into account as a structural parameter:

a distance between the ultrasonic sensor on the one hand and an outlet of an exhaust pipe of the exhaust system on the other hand—specifically, the relationship is that the lower this distance, the greater the probability of the presence of an exhaust gas cloud in the detection region of the ultrasonic sensor; and/or a cross section size of the exhaust pipe—the cross section of the exhaust pipe also specifically has an influence on the generation of the exhaust gas cloud in the region of the exhaust pipe; and/or the number of exhaust pipes of the exhaust system; and/or the number of exhaust gas turbochargers of the motor vehicle; and/or a swept volume of an internal combustion engine of the motor vehicle, that is to say a cubic capacity; and/or a type of internal combustion engine, that is to say whether the internal combustion engine is a petrol engine or else a diesel engine.

At least one parameter which is detected by the ultrasonic sensor itself can optionally also be taken into account for the detection of the exhaust gas cloud. Specifically, the exhaust gas cloud can be detected, in particular the probability value can be calculated, depending on a propagation time of the ultrasound waves and therefore depending on the measured distances and/or depending on the number of target echoes or the number of detected objects. A direct measurement, in which the same ultrasonic sensor emits the ultrasound waves and then receives the target echoes, and/or an indirect measurement, in which one ultrasonic sensor emits the ultrasound waves and a separate ultrasonic sensor receives the target echoes, can be taken into account here. If, for example, an object is detected a very short distance away, this can be interpreted, for the purpose of checking the plausibility of the detection of the exhaust gas cloud, as meaning that this close object is the exhaust gas cloud itself. The plausibility of the detection of the exhaust gas cloud can be reliably checked in this way.

If the exhaust gas cloud is detected, an extremely wide variety of embodiments which then ensure operationally fail-safe and reliable operation of the ultrasonic sensor apparatus can therefore be provided:

The operation of the ultrasonic sensor apparatus depending on the detection of the exhaust gas cloud involves distance values which are measured by the ultrasonic sensor apparatus and are lower than a predetermined threshold value being blanked out on account of the detection of the exhaust gas cloud. This means that a detected object, which is detected at a distance of less than the predetermined threshold value, is not indicated to the driver of the motor vehicle. The reason for this is that it is very highly probable that this object is the exhaust gas cloud.

This embodiment has the advantage that situations in which the driver is unnecessarily disturbed by corresponding warning signals even though there is actually no real object in the area surrounding the motor vehicle can be prevented.

The distance values, which are lower than the threshold value, can also be blanked out on the condition that the current speed of the motor vehicle is below a predetermined threshold value. Specifically, the exhaust gas cloud can usually form only when the motor vehicle is stationary or else at low speeds. If the motor vehicle is moving at a relatively high speed, all measured distance values are preferably output.

The ultrasonic sensor apparatus can also be designed such that a blocked state of the ultrasonic sensor—in particular a state in which the said ultrasonic sensor is blocked by dirt and/or ice and/or snow—can be detected depending on at least one oscillation parameter of the ultrasonic sensor, in particular depending on a decay time of a diaphragm of the ultrasonic sensor. The operation of the ultrasonic sensor apparatus depending on the detection of the exhaust gas cloud can then involve the detection of the blocked state being ignored by the ultrasonic sensor apparatus on account of the detection of the exhaust gas cloud. This means that, in particular when both the exhaust gas cloud and a state in which the ultrasonic sensor is blocked by an additional mass are detected, a corresponding warning signal which otherwise advises the driver of the blocked state of the ultrasonic sensor and therefore of the need to clean the sensor is not output.

In addition or as an alternative, the operation of the ultrasonic sensor apparatus depending on the detection of the exhaust gas cloud involves it being possible for a control signal to be output to the exhaust system on account of the detection of the exhaust gas cloud. An existing exhaust gas cloud can be produced and reliable operation of the ultrasonic sensor apparatus can be made possible by virtue of corresponding driving of at least one component of the exhaust system.

In this connection, it can be provided, in particular, that a throttle valve of the exhaust system, by means of which throttle valve the exhaust gas is restricted, is driven by the control signal. The exhaust gas cloud can be broken down and reliable operation of the ultrasonic sensor apparatus can be re-established by briefly restricting the exhaust gas.

In addition or as an alternative, the exhaust system can have at least two exhaust pipes, at least one of which is designed such that it can be closed, wherein the at least one exhaust pipe which can be closed can be opened by the control signal. Improved and more expedient distribution of the exhaust gas is achieved by opening all of the exhaust pipes, as a result of which an exhaust gas cloud which has already been detected can in turn be dispersed.

The invention also relates to an ultrasonic sensor apparatus for a motor vehicle, comprising at least one ultrasonic sensor and comprising a control device which is designed to drive the ultrasonic sensor to emit ultrasound waves into a surrounding region of the motor vehicle in order to carry out a distance measurement. The ultrasonic sensor apparatus is designed to carry out a method according to the invention.

A motor vehicle according to the invention, in particular a passenger car, comprises an ultrasonic sensor apparatus according to the invention.

The preferred embodiments and the advantages thereof presented with respect to the method according to the invention accordingly apply to the ultrasonic sensor apparatus according to the invention and also to the motor vehicle according to the invention.

Further features of the invention can be gathered from the claims, the figures and the description of the figures. All of the features and combinations of features mentioned above in the description and the features and combinations of features mentioned below in the description of the figures and/or shown in the figures alone can be used not only in the respectively stated combination, but also in other combinations or else on their own.

Figure 2:
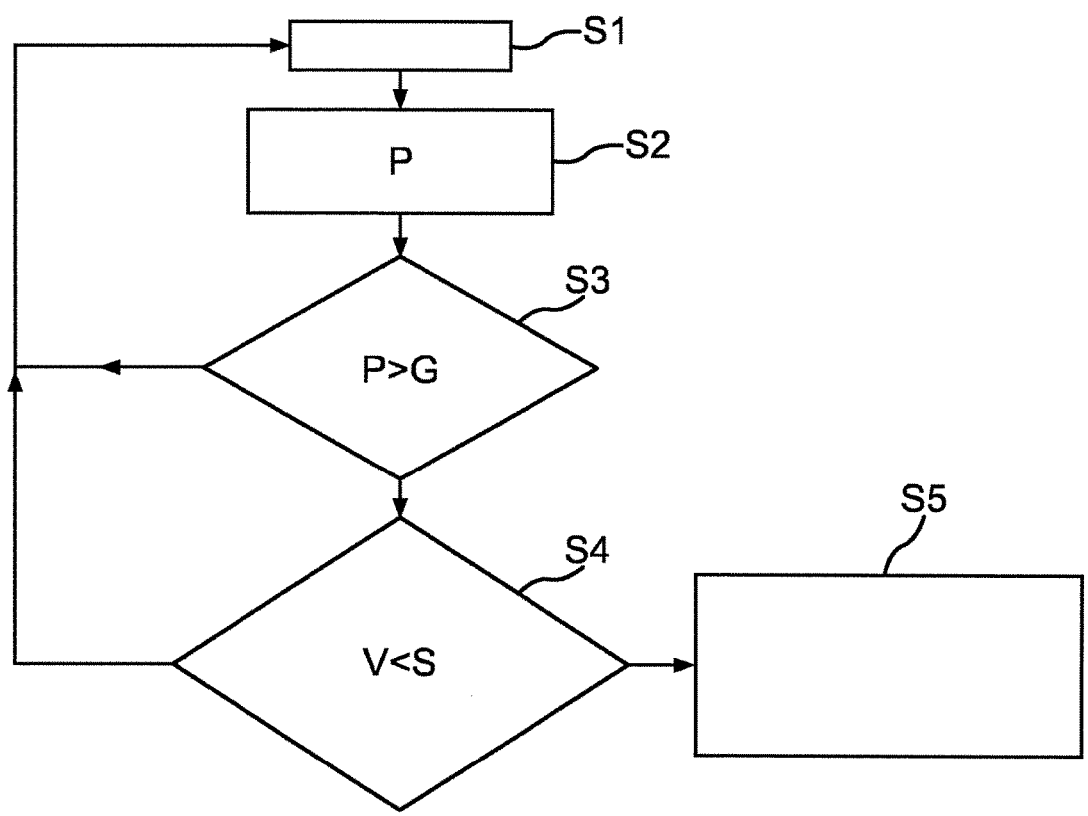

The invention will be explained in greater detail below using a preferred exemplary embodiment and also with reference to the accompanying drawings, in which:

FIG. 1 is a schematic illustration of a motor vehicle comprising an ultrasonic sensor apparatus according to one embodiment of the invention; and FIG. 2 shows a flowchart of a method according to one embodiment of the invention.

A motor vehicle 1 illustrated in FIG. 1 is, for example, a passenger car. The motor vehicle 1 comprises an ultrasonic sensor apparatus 2 which is, for example, a parking aid or a parking assistance system. The ultrasonic sensor apparatus 2 serves to assist the driver of the motor vehicle 1 when carrying out parking operations. To this end, the said ultrasonic sensor apparatus comprises a large number of ultrasonic sensors 3 which are arranged in a manner distributed over the rear bumper 4. Corresponding ultrasonic sensors 3 can also be arranged on the front bumper 5 (not illustrated). The ultrasonic sensors 3 are electrically coupled to a control device 6 of the ultrasonic sensor apparatus 2. The control device 6 constitutes a controller which can comprise, for example, a digital signal processor and/or a microcontroller and serves to drive the ultrasonic sensors 3. The control device 6 receives measurement data from the ultrasonic sensors 3 and determines the distances between the motor vehicle 1 and obstacles which are located in the area surrounding the said motor vehicle depending on the said measurement data. The control device 6 can drive, for example, a loudspeaker 7 and/or an optical indicator device 8—for example a display—depending on the said distances. The driver is informed of the measured distances with the aid of the loudspeaker 7 and/or the indicator device 8. For the purpose of carrying out a distance measurement, the respective ultrasonic sensors 3 are driven in order to emit ultrasound waves into a surrounding region 9 of the motor vehicle 1. Both so-called cross-measurements (indirect measurements) and also direct measurements are possible in the process. In the case of indirect measurements, a first ultrasonic sensor 3 emits the ultrasound waves while at least one other, second ultrasonic sensor 3 is operated as a receiving sensor which receives the echo signals. In the case of direct measurements however, the same ultrasonic sensor 3 is driven both for transmitting purposes and also for receiving purposes.

The ultrasonic sensor apparatus 2 may possibly also be an automatic or semiautomatic parking assistance system by means of which a parking space is automatically detected and a suitable parking path along which the motor vehicle 1 can then be automatically or semi-autonomously driven into the parking space is automatically calculated. In the case of fully automatic parking assistance systems, the ultrasonic sensor apparatus 2 performs both the longitudinal control and also the lateral control of the motor vehicle 1 whereas, in the case of semiautomatic systems, the ultrasonic sensor apparatus 2 performs only the lateral control, and therefore the steering, automatically while the driver has to accelerate and brake himself. Systems in which the driver has to perform both the longitudinal control and also the lateral control himself but steering instructions are output by the ultrasonic sensor apparatus 2 are also known.

An internal combustion engine 10 to which an exhaust system 11 of the motor vehicle 1 is connected in a manner which is known per se is provided for the purpose of driving the motor vehicle 1. In the exemplary embodiment, the exhaust system 11 has two exhaust pipes 12, 13 which each have an outlet 14, 15 via which an exhaust gas which is generated by the internal combustion engine 10 is output to the surrounding region 9. Furthermore, a controller 16 which serves to drive a throttle valve, not illustrated, of the exhaust system 11 and/or to close and open the exhaust pipes 12, 13 and/or to drive the internal combustion engine 10 is arranged in the motor vehicle 1.

At least one sensor 18 which serves to detect at least one of the following measurement variables: a current temperature of the exhaust gas and/or a current moisture content of the exhaust gas and/or a current flow rate of the exhaust gas and/or a current exhaust gas pressure and/or a current mass flow of the exhaust gas and/or a current measurement variable which characterizes the current ratio of combustion air to a fuel in at least one combustion chamber of the internal combustion engine 10 (a lambda probe is used in this case) is arranged in the exhaust system 11.

The sensor data from the at least one sensor 18 is transmitted to the control device 6.

Furthermore, an engine temperature of the internal combustion engine 10 can be detected by means of a temperature sensor 19. This sensor data, which indicates the respectively current engine temperature, can also be transmitted to the control device 6.

At least one sensor 20 which serves to detect atmospheric conditions in the area surrounding the motor vehicle 1, in particular an air humidity and/or air temperature and/or wind speed in the surrounding region 9, can also be arranged in the motor vehicle 1. In addition or as an alternative, position signals which are provided by means of a navigation receiver 21 (for example GPS) and indicate the current geographical position of the motor vehicle 1 can also be used for the purpose of detecting the said data. If the current position of the motor vehicle 1 is known in the control device 6, a communication link, by means of which the current position of the motor vehicle 1 can be transmitted from the control device 6 to the Internet server, can be established between the control device 6 on the one had and an Internet server on the other hand. The Internet server can then transmit data which indicates the current air temperature and/or wind speed and/or air humidity in the area surrounding the motor vehicle 1 to the control device 6.

The control device 6 is designed such that it can detect, depending on sensor data, whether an exhaust gas cloud 22, at the boundary layer of which the ultrasound waves which are emitted by the ultrasonic sensors 3 can be reflected, forms in the region of the respective outlet 14, 15 of the exhaust pipes 12, 13 and therefore in the detection region of the ultrasonic sensors 3. A related method for operating the ultrasonic sensor apparatus 2 will be explained in greater detail below with reference to FIG. 2:

The method begins in step S1, in which sensor data for the detection of an exhaust gas cloud 22 is detected by the control device 6. The following sensor data can be taken into account:

the temperature of the exhaust gas and/or
the moisture content of the exhaust gas and/or
the flow rate of the exhaust gas and/or
the exhaust gas pressure and/or
the mass flow of the exhaust gas and/or
the ratio of the combustion air to the fuel and/or
the current engine temperature and/or
the current wind speed and/or air humidity and/or air temperature in the area surrounding the vehicle.

The following structural parameters of the motor vehicle can optionally also be stored in the control device 6 and taken into account for the detection of the exhaust gas cloud 22:

a distance between the respective ultrasonic sensor 3 and the outlet 14, 15 of the respective exhaust pipe 12, 13 and/or
a cross section size of the exhaust pipes 12, 13 and/or
the number of exhaust pipes 12, 13 and/or
the number of exhaust gas turbochargers of the exhaust system 11 and/or
the swept volume of the internal combustion engine 10 and/or the type of internal combustion engine 10 (petrol engine or diesel engine).

The control device 6 can optionally also take into account the distances measured by the respective ultrasonic sensor 3 and/or the number of received target echoes.

In step S2, the abovementioned variables and/or parameters are evaluated in any desired combination by the control device 6, wherein the measurement variables can also be weighted. For the detection of the exhaust gas cloud 22, a probability value P which indicates the current probability of the presence of an exhaust gas cloud 22 of this kind is calculated. The abovementioned sensor data and optionally also the structural parameters of the motor vehicle 1 are taken into account for the calculation of the probability value P. As already mentioned, these can also be correspondingly weighted. According to step S3, a check is then made as to whether the calculated probability value P is greater than a prespecified limit value G. If the control device 6 detects that the probability value P is greater than the limit value G, it is assumed that the exhaust gas cloud 22 is present in the detection region of the ultrasonic sensor apparatus 2.

If an exhaust gas cloud 22 is not detected, the method returns to step S1. However, if the exhaust gas cloud 22 is detected according to step S3, the method moves to a further step S4 in which a check is made as to whether the current speed V of the motor vehicle 1 is less than a prespecified threshold value S. If this is not the case, the method returns to step S1. If the speed V is less than the threshold value S, the control device 6 can take at least one of the following measures according to step S5:

as a result of the detection of the exhaust gas cloud 22, the control device 6 can blank out or ignore those distance values which are lower than a predetermined threshold value and therefore may originate from the exhaust gas cloud 22; and/or if it is detected on the basis of at least one oscillation parameter of an ultrasonic sensor 3 that the said ultrasonic sensor is blocked or covered by snow and/or dirt and/or ice, this detection of the blocked state of the ultrasonic sensor 3 can initially be ignored as a result of the detection of the exhaust gas cloud 22; and/or the control device 6 can also output a control signal to the controller 16 in order to, for example by means of the said throttle valve, restrict the exhaust gas and/or open all of the existing exhaust pipes 12, 13 in order to better distribute the emitted exhaust gas.

The invention claimed is:

1. A method for operating an ultrasonic sensor apparatus of a motor vehicle, comprising:
    emitting ultrasound waves into a surrounding region of the motor vehicle by an ultrasonic sensor of the ultrasonic sensor apparatus in order to carry out a distance measurement;
    determining, by the ultrasonic sensor apparatus, a probability value of a presence of an exhaust gas cloud being emitted into the surrounding region by an exhaust system of the motor vehicle at which the ultrasound waves are reflected, wherein the probability value is determined, at least in part, on the basis of sensor data from at least one sensor of the motor vehicle different from the ultrasonic sensor; and
    operating the ultrasonic sensor apparatus depending on the probability value of the presence of the exhaust gas cloud,
    wherein the operation of the ultrasonic sensor apparatus depending on the probability value comprises a control signal being output to the exhaust system on account of the probability value.

2. The method according to claim 1, wherein the probability value indicates the current probability of the presence of the exhaust gas cloud, being calculated depending on the sensor data, and the presence of the exhaust gas cloud being detected when the probability value is greater than a predetermined limit value.

3. The method according to claim 1, wherein the probability value of the presence of the exhaust gas cloud is determined depending on at least one measurement variable as sensor data, which measurement variable is measured by a sensor which is arranged in the exhaust system depending on at least one of the following measurement variables:
    a temperature of the exhaust gas,
    a moisture content of the exhaust gas,
    a flow rate of the exhaust gas,
    an exhaust gas pressure,
    a mass flow of the exhaust gas, and/or
    a measurement variable which characterizes the ratio of combustion air to a fuel in at least one combustion chamber of an internal combustion engine of the motor vehicle, which measurement variable is measured by means of a lambda probe.

4. The method according to claim 1, wherein the probability value of the presence of the exhaust gas cloud is determined depending on a current motor temperature as sensor data.

5. The method according to claim 1, wherein the probability value of the presence of the exhaust gas cloud is determined depending on atmospheric conditions in the area surrounding the motor vehicle depending on a wind speed and/or air humidity and/or air temperature.

6. The method according to claim 1, wherein the probability value of the presence of the exhaust gas cloud is determined depending on at least one structural parameter of the motor vehicle depending on at least one of the following parameters:
    a distance between the ultrasonic sensor and an outlet of an exhaust pipe of the exhaust system,
    a cross section size of the exhaust pipe,
    the number of exhaust pipes of the exhaust system,
    the number of exhaust gas turbochargers of the motor vehicle,
    a swept volume of an internal combustion engine of the motor vehicle, and/or
    a type of internal combustion engine.

7. The method according to claim 1, wherein the probability value of the presence of the exhaust gas cloud is determined depending on a propagation time of the ultrasound waves and/or depending on the number of target echoes which are received in relation to the emitted ultrasound waves by at least one ultrasonic sensor.

8. The method according to claim 1, wherein operating the ultrasonic sensor apparatus comprises using distance values which are measured by the ultrasonic sensor apparatus and are lower than a predetermined threshold value being blanked out on account of determining the probability value.

9. The method according to claim 8, wherein the blanking-out process is performed on the condition that the current speed of the motor vehicle is below a predetermined threshold value.

10. The method according to claim 1, wherein a blocked state of the ultrasonic sensor is detected by the ultrasonic sensor apparatus depending on at least one oscillation parameter of the ultrasonic sensor depending on a decay time of a diaphragm of the ultrasonic sensor, wherein the operation of the ultrasonic sensor apparatus depending on the probability value comprises the detection of the blocked state being ignored by the ultrasonic sensor apparatus on account of the probability value.

11. The method according to claim 1, wherein:
a throttle valve by means of which the exhaust gas is restricted is driven by the control signal, and
the exhaust system has at least two exhaust pipes, at least one of which is able to be closed, and the at least one exhaust pipe which is able to be closed is opened by the control signal.

12. An ultrasonic sensor apparatus for a motor vehicle, comprising:
an ultrasonic sensor; and
a control device for driving the ultrasonic sensor to emit ultrasound waves into a surrounding region of the motor vehicle in order to carry out a distance measurement,
wherein the control device determines a probability value of a presence of an exhaust gas cloud being emitted into the surrounding region by an exhaust system of the motor vehicle, and at which the ultrasound waves are reflected,
wherein the probability value is determined, at least in part, on the basis of sensor data from at least one sensor of the motor vehicle different from the ultrasonic sensor, and operates the ultrasonic sensor apparatus depending on the probability value of the presence of the exhaust gas cloud,
wherein the operation of the ultrasonic sensor apparatus depending on the probability value comprises a control signal being output to the exhaust system on account of the probability value.

13. A motor vehicle passenger car, comprising an ultrasonic sensor apparatus according to claim 12.

* * * * *